(12) United States Patent
Abe et al.

(10) Patent No.: US 10,906,528 B2
(45) Date of Patent: Feb. 2, 2021

(54) VEHICLE CONTROL UNIT

(71) Applicant: MITSUBISHI JIDOSHA KOGYO KABUSHIKI KAISHA, Tokyo (JP)

(72) Inventors: Hironori Abe, Tokyo (JP); Ryo Shimizu, Tokyo (JP); Kota Nasu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/769,439

(22) PCT Filed: Aug. 29, 2018

(86) PCT No.: PCT/JP2018/031964
§ 371 (c)(1),
(2) Date: Jun. 3, 2020

(87) PCT Pub. No.: WO2019/111458
PCT Pub. Date: Jun. 13, 2019

(65) Prior Publication Data
US 2020/0384978 A1 Dec. 10, 2020

(30) Foreign Application Priority Data
Dec. 4, 2017 (JP) .................................. 2017-232751

(51) Int. Cl.
*B60W 20/40* (2016.01)
*B60W 20/13* (2016.01)
(Continued)

(52) U.S. Cl.
CPC ............ *B60W 20/40* (2013.01); *B60W 10/02* (2013.01); *B60W 10/08* (2013.01); *B60W 20/13* (2016.01);
(Continued)

(58) Field of Classification Search
CPC ................. B60W 20/40; B60W 20/20; B60W 30/18054; B60W 10/08; B60W 10/02;
(Continued)

(56) References Cited

U.S. PATENT DOCUMENTS 9,827,981 B2 * 11/2017 Takeuchi .............. B60W 10/26
2011/0115318 A1   5/2011 Hashimoto et al.
(Continued)

FOREIGN PATENT DOCUMENTS

JP      2008-1258 A    1/2008
JP      2008-174146 A  7/2008
(Continued)

OTHER PUBLICATIONS

International Search Report, issued in PCT/JP2018/031964, dated Oct. 30, 2018.
(Continued)

*Primary Examiner* — Justin Holmes
(74) *Attorney, Agent, or Firm* — Birch, Stewart, Kolasch & Birch, LLP

(57) ABSTRACT

In a vehicle (10) comprising a first rotating electric machine (3) that serves as a driving source for running the vehicle (10) and that exchanges electric power with a battery (6), and an engine (2) that serves as the driving source, a first connecting/disconnecting mechanism (20) is disposed on a first power transmission path from the first rotating electric machine (3) to a driving wheel, and a second connecting/disconnecting mechanism (30) is disposed on a second power transmission path from the engine (2) to the driving wheel. A first running mode in which the vehicle (10) is driven by power of the engine (2) in a state where the second connecting/disconnecting mechanism (30) is engaged, and another running mode in which the first connecting/disconnecting mechanism (20) is engaged and the second connect-
(Continued)

ing/disconnecting mechanism (30) is disengaged are set for the vehicle (10). A control unit (5) includes: a connecting/disconnecting mechanism controller (5D) that disengages the first connecting/disconnecting mechanism (20) when a predetermined condition is satisfied during the first running mode; and a rotating electric machine controller (5E) that variably controls a standby rotation speed (Nw) of the first rotating electric machine (3) when the first connecting/disconnecting mechanism (20) is disengaged.

11 Claims, 6 Drawing Sheets

(51) Int. Cl.
*B60W 20/20* (2016.01)
*B60W 10/02* (2006.01)
*B60W 10/08* (2006.01)
*B60W 30/18* (2012.01)

(52) U.S. Cl.
CPC ...... *B60W 20/20* (2013.01); *B60W 30/18054* (2013.01); *B60W 2510/242* (2013.01); *B60W 2520/28* (2013.01); *B60W 2710/021* (2013.01); *B60W 2710/06* (2013.01); *B60W 2710/08* (2013.01)

(58) Field of Classification Search
CPC ........... B60W 20/13; B60W 2510/242; B60W 2710/06; B60W 2710/08; B60W 2710/021; B60W 2520/28
See application file for complete search history.

(56) References Cited

U.S. PATENT DOCUMENTS

| | | |
|---|---|---|
| 2013/0005530 A1 | 1/2013 | Fujikawa et al. |
| 2014/0374211 A1 | 12/2014 | Date |
| 2016/0325730 A1 | 11/2016 | Ono et al. |
| 2016/0375789 A1* | 12/2016 | Park .................. B60W 20/10 701/22 |
| 2017/0066436 A1 | 3/2017 | Endo et al. |
| 2018/0147931 A1* | 5/2018 | Toyota .................. B60K 6/36 |

FOREIGN PATENT DOCUMENTS

| | | |
|---|---|---|
| JP | 2013-180680 A | 9/2013 |
| JP | 2014-104766 A | 6/2014 |
| JP | 2015-131513 A | 7/2015 |
| JP | 2016-7988 A | 1/2016 |
| JP | 2016-179780 A | 10/2016 |
| WO | WO 2011/111199 A1 | 9/2011 |

OTHER PUBLICATIONS

Written Opinion of the International Searching Authority, issued in PCT/JP2018/031964, dated Oct. 30, 2018.
English Translation of the International Preliminary Report on Patentability (IPRP) dated Jun. 4, 2020 in PCT/JP2018/031964.
Extended European Search Report issued in corresponding European Application No. 18884972.3 dated Nov. 23, 2020.

* cited by examiner

VEHICLE CONTROL UNIT

TECHNICAL FIELD

The present disclosure relates to a control unit for a hybrid vehicle including a rotating electric machine and an engine serving as driving sources and a driving-purpose battery.

BACKGROUND ART

Conventionally, in a hybrid vehicle equipped with an engine and a rotating electric machine (motor, generator, motor generator), a vehicle that runs while switching its running mode is practically used. The running mode includes an EV mode in which the vehicle runs only on the motor using the charged power of a battery, a series mode in which the generator is driven by the engine and the vehicle runs only on the motor while the motor is generating electric power, and a parallel mode that the vehicle runs mainly on the engine while being assisted by the motor. Switching of the running mode is accomplished by controlling clutches (connecting/disconnecting mechanisms) interposed between the engine and an outputting shaft and between the motor and the outputting shaft (e.g., see Patent Document 1).

PRIOR ART DOCUMENTS

Patent Literature

[Patent Document 1] Japanese Laid-open Patent Publication No. 2016-179780

SUMMARY

Detailed Description

Problems to be Solved by the Disclosure

Incidentally, in the hybrid vehicle capable of individually outputting the power of the engine and the power of the motor, the power transmission path from the engine to the driving wheels and the power transmission path from the motor to the driving wheels are provided separately. In general, such a hybrid vehicle selects a mode (parallel mode) in which the vehicle runs mainly on the engine when the running load or the vehicle speed increases. In the parallel mode, if the motor assist is not required, i.e., if the vehicle can run only on the power of the engine, the motor is accompanied, being accompanied by the driving wheels. If the induced voltage generated by this rotation of the motor exceeds the voltage of the driving-purpose battery, the regenerative brake will be activated on the vehicle, which may give the driver a feeling of discomfort.

Conventionally, in order not to give such a discomfort, occurrence of unintentional regenerative braking during high-speed running has been prohibited by performing flux-weakening control. However, since the implementation of the flux-weakening control consumes electric power, implement this control is not preferable from the viewpoint of improvement in electric efficiency. Further, for example, as in Patent Document 1 described above, it is also conceivable to provide a clutch for disengaging the motor from the power transmission path during engine running.

However, in cases where a hydraulic friction clutch (e.g., a multi-disc clutch) is provided, a hydraulic circuit and an oil pump are required, which inevitably increases the size and complexity of the device. On the other hand, in cases where a mechanical clutch (e.g., a dog clutch) is provided, it is possible to reduce the size and simplify the device, but reengagement of the clutch after being opened needs to synchronize at least the rotation. Consequently, this structure takes time to reengage the clutch and there is a possibility of deteriorating the power performance of the vehicle.

Means to Solve Problem (1) A control unit disclosed herein controls a vehicle including a first rotating electric machine that serves as a driving source for running the vehicle and that exchanges electric power with a battery, and an engine that serves as the driving source. The vehicle includes a first connecting/disconnecting mechanism disposed on a first power transmission path from the first rotating electric machine to a driving wheel, a second connecting/disconnecting mechanism disposed on a second power transmission path from the engine to the driving wheel, and a rotation speed sensor that detects, as an axle rotation speed, a rotation speed correlated with a rotation speed of a side of the driving wheel; and a first running mode (a so-called parallel mode) in which the vehicle is driven by power of the engine in a state where the second connecting/disconnecting mechanism is engaged, and another running mode (so-called EV mode or series mode) in which the first connecting/disconnecting mechanism is engaged and the second connecting/disconnecting mechanism is disengaged are set for the vehicle; the control unit includes: a connecting/disconnecting mechanism controller that disengages the first connecting/disconnecting mechanism when a predetermined condition is satisfied during the first running mode; a rotating electric machine controller that variably controls a standby rotation speed of the first rotating electric machine when the first connecting/disconnecting mechanism is disengaged; a calculator that calculates a power supplying capability of the battery. The rotating electric machine controller controls the standby rotation speed such that a difference between the axle rotation speed and the standby rotation speed comes to be smaller when the power supplying capability is lower.

(2) Preferably, the calculator calculates, as the power supplying capability, a maximum output that the battery is capable of outputting; and the rotating electric machine controller controls the standby rotation speed in accordance with the maximum output.

(3) Preferably, the calculator calculates, as the power supplying capability, a maximum output that the battery is capable of outputting; and the rotating electric machine controller controls the standby rotation speed such that a difference between the axle rotation speed and the standby rotation speed comes to be smaller as the maximum output is lower.

(4) The rotating electric machine controller preferably makes the standby rotation speed match the axle rotation speed when the maximum output is equal to or smaller than a predetermined value.

(5) The rotating electric machine controller preferably control the standby rotation speed such that a synchronization time taken to reengage the first connecting/disconnecting mechanism is a predetermined time or shorter.

(6) It is preferably that a plurality of driving modes are set for the vehicle independently of the running modes. In this case, the rotating electric machine controller preferably sets the standby rotation speed to zero when an energy saving mode in which consumption of at least one of electric power and fuel is suppressed among the plurality of driving modes is set.

(7) It is preferable that a plurality of driving modes are set for the vehicle independently of the running modes. In this case, the rotating electric machine preferably sets the standby rotation speed such that a synchronization time taken to reengage the first connecting/disconnecting mechanism when a sport mode in which accelerability is valued highly among the plurality of driving modes is set is shorter than a synchronization time when a driving mode except for the sport mode is set.

(8) It is preferable that a plurality of driving modes are set for the vehicle independently of the running modes. The predetermined condition preferably includes a sport mode in which accelerability is valued highly not being set among the plurality of driving modes.

(9) The controller preferably includes an estimator that estimates a required output based on a depression amount of an acceleration pedal. In this case, the predetermined condition preferably includes the required output being a predetermined output value or smaller.

(10) It is preferable that the vehicle further includes the first rotating electric machine that drives one of a front wheel and a rear wheel, and a second rotating electric machine that drives the other of the front wheel and the rear wheel. In this case, the predetermined condition preferably includes a maximum output that the second rotating electric machine is capable of outputting is larger than the maximum output that the battery is capable of outputting.

(11) It is preferable that the vehicle further includes a third rotating electric machine that supplies the battery with electric power by generating the electric power when being driven with the power of the engine; and a second running mode (so-called EV mode) in which at least one of power of the first rotating electric machine and power of the second rotating electric machine is transmittable to the wheel in a state where the second connecting/disconnecting mechanism is disengaged and the engine is stopped, and a third running mode (so-called series mode) in which at least one of the power of the first rotating electric machine and the power of the second rotating electric machine is transmittable to the wheel in a state where the second connecting/disconnecting mechanism is disengaged and the third rotating electric machine is generating power are set for the vehicle. In this case, the connecting/disconnecting mechanism controller disengages the first connecting/disconnecting mechanism when the vehicle is driven by the power the second rotating electric machine, not using the first rotating electric machine, during the second running mode or the third running mode.

Effect of the Disclosure

According to the vehicle control unit disclosed herein, since a first connecting/disconnecting mechanism is disengaged when a predetermined condition is satisfied during a first running mode in which the vehicle is running mainly on the engine, so that it is possible to prevent the rotating electric machine from rotating being accompanied. Thus, since the conventional flux-weakening control is not required, the electric efficiency can be improved. Further, since the standby rotation speed of the first rotating electric machine is variably controlled during disengagement of the first connecting/disconnecting mechanism, it is possible to shorten the synchronization time when the first connecting/disconnecting mechanism is engaged. In the event of engaging the first connecting/disconnecting mechanism, the first connecting/disconnecting mechanism can be rapidly engaged. Thus, it is possible to prevent the power performance of the vehicle and to ensure the power performance from deteriorating.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

EMBODIMENT TO CARRY OUT THE DISCLOSURE

Description will now be made in relation to a vehicle control unit according to an embodiment with reference to the accompanying drawings. The following embodiment is merely illustrative and is not intended to exclude the application of various modifications and techniques not explicitly described in the embodiment. Each configuration of the present embodiment can be variously modified and implemented without departing from the scope thereof. Also, the configuration can be selected or omitted according to the requirement or appropriately combined.

[1. Overall Configuration]

Figure 1:
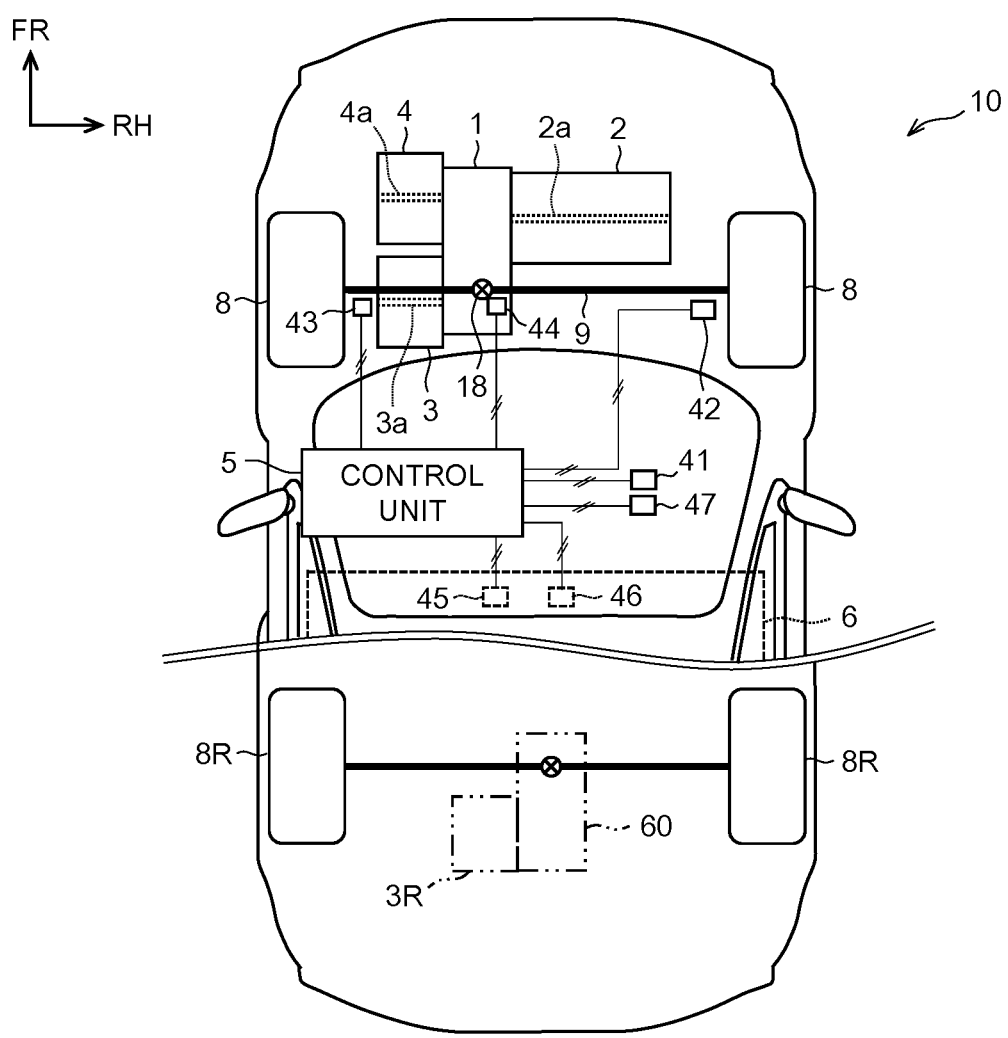
FIG. 1 is a top view illustrating an internal structure of a vehicle mounted with a control unit according to an embodiment.

A control unit 5 of the present embodiment is applied to a vehicle 10 shown in FIG. 1, and controls a transaxle 1 mounted on the vehicle 10. The vehicle 10 is a hybrid vehicle equipped with an engine 2 as a driving source and a motor 3 (electric motor, a first rotating electric machine) for running, and a generator 4 (a third rotating electric machine) for power generation. The generator 4 is coupled to the engine 2 and is operable independently of the operating state of the motor 3. In addition, three of running modes of an EV mode, a series mode, and a parallel mode are prepared for the vehicle 10. These running modes, by the control unit 5, are alternatively selected according to the vehicle state and the running state, and a required output of the driver, and the engine 2, the motor 3, and the generator 4 are individually used depending on the selected mode.

The EV mode (second running mode, another running mode) is a running mode in which the vehicle 10 is driven only on the motor 3 using the charged power of a driving-purpose battery 6, stopping the engine 2 and the generator 4. The EV mode is selected when a driving load and a vehicle speed are low or the charging level of the battery 6 is high. The series mode (third running mode, another running mode) is a running mode in which the generator 4 is driven by the engine 2 to generate electric power and also the vehicle 10 is driven by the motor 3 using the generated electric power. The series mode is selected when a running load and a vehicle speed are moderate, or the charging level of the battery 6 is low. The parallel mode (first running mode) is a running mode in which a second dog clutch 30 to be described below is made into an engaged state to drive the vehicle 10 mainly by the power of the engine 2 and the driving of the vehicle 10 is assisted by the motor 3 if necessary, and is selected when a running load and a vehicle speed are high.

The diving wheels 8 (front wheels in this embodiment), the engine 2 and the motor 3 are connected in parallel through the transaxle 1, and the respective power of the engine 2 and the motor 3 are individually transmitted from different power transmission paths. This means that each of the engine 2 and the motor 3 is a driving source that drives the output shaft 12 of the vehicle 10. Further, to the engine 2, the generator 4 and the driving wheels 8 are connected in parallel through the transaxle 1, and the power of the engine 2 is also transmitted to the generator 4 in addition to the driving wheels 8.

The transaxle 1 is a power transmission device formed by integrating a final drive (final reduction gear) including a differential gear 18 (differential device) and a transmission (reduction gear), and incorporates therein multiple mechanisms that is involved in power transmission between the driving source and a driven device. The transaxle 1 of the present embodiment is configured to enable high-low switching (switching between the high-speed stage and the low-speed stage). In the running in the parallel mode, the high-gear stage and the low-gear stage are switched by the control unit 5 according to, for example, the running state or the required output. Hereinafter, the running in the parallel mode is also referred to as "parallel driving".

The engine 2 is an internal combustion engine (gasoline engine, diesel engine) that uses gasoline or diesel oil as fuel. The engine 2 is a so-called lateral engine arranged laterally such that the direction of a crankshaft 2a (rotary shaft) coincides with the width direction of the vehicle 10, and is fixed to the right side surface of the transaxle 1. The crankshaft 2a is positioned in parallel to the drive shaft 9 of the drive wheels 8. The operating state of the engine 2 is controlled by the control unit 5.

The motor 3 and the generator 4 of the present embodiment are each an electric motor generator having both a function as an electric motor and a function as a generator. The motor 3 is a driving source that exchanges power with the battery 6, mainly functions as an electric motor to drive the vehicle 10, and functions as a generator during regeneration. The generator 4 functions as an electric motor (starter) when starting the engine 2, and supplies electric power to the battery 6 by generating, when the engine 2 is operating, electric power as a result of being driven with the engine power. An inverter (not shown) for converting a direct current and an alternating current is provided around (or in) each of the motor 3 and the generator 4. Each of the rotation speeds of the motor 3 and the generator 4 is controlled by controlling the inverter. Incidentally, the operating states of the motor 3, the generator 4, and the inverters are controlled by the control unit 5.

Figure 2:
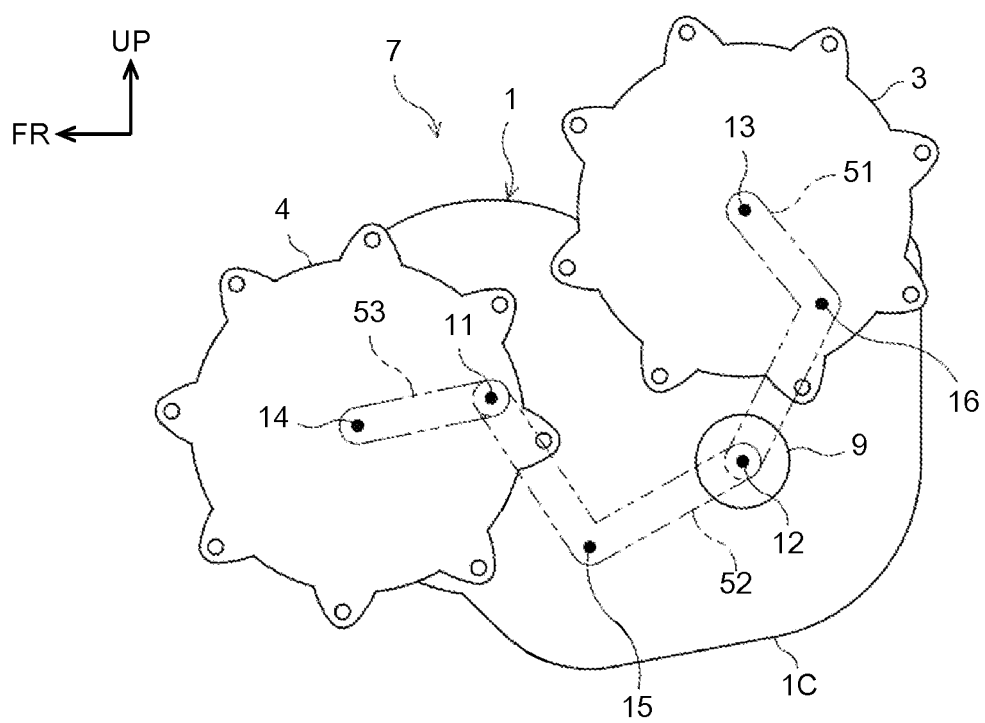
FIG. 2 is a schematic side view showing a powertrain including a transaxle mounted on the vehicle of FIG. 1.

FIG. 2 is a side view of the power train 7 as viewed from the left side. The powertrain 7 includes the engine 2, the motor 3, the generator 4, and the transaxle 1. In FIG. 2, the engine 2 is omitted.

In the vehicle 10, the control unit 5 for integrally controlling various devices mounted on the vehicle 10. Further, the vehicle 10 includes an acceleration opening sensor 41 that detects the depression amount of the accelerator pedal (degree of acceleration opening), a vehicle speed sensor 42 that detects the vehicle speed V, a motor rotation speed sensor 43 that detects the rotation speed of the motor 3, a rotation speed sensor 44 that detects a rotation speed correlated with the rotation speed (rotation speed of the output shaft 12 in this embodiment) of the driving wheels 8 as an axle rotation speed Na, a voltage sensor 45 that detects the voltage of the battery 6, and a current sensor 46 that detects the input and output currents of the battery 6. The data detected by each of the sensors 41 to 46 is transmitted to the control unit 5.

Further, multiple driving modes are provided for the vehicle 10 of the present embodiment, the mode setting switch 47 for setting the driving mode is provided. The driving modes are a control mode different from the running modes (EV mode, series mode, parallel mode), and the power performances thereof are different from each other. For the vehicle 10 of the present embodiment, an ECO mode (energy suppression mode) to suppress the consumption of at least one of electric power and fuel (valuing fuel efficiency and electricity efficiency) rather than accelerability, and a sport mode that more highly values accelerability than fuel efficiency and electricity efficiency, a normal mode that values accelerability the same in extent as fuel efficiency and electric efficiency. In the present embodiment, the normal mode is automatically set at the start of the vehicle 10, the driving mode can be freely switched by the manual operation of the driver. Here, the driving mode may be automatically set (switched) by the vehicle 10. The mode information set by the mode setting switch 47 is transmitted to the control unit 5.

The control unit 5 is an electronic controller configured to be an LSI device or an embedded electronic device in which, for example, a microprocessor, a ROM, a RAM, and the like are integrated, and integrally controls various devices mounted on the vehicle 10. The control unit 5 of the present embodiment selects a running mode in accordance with a required output of the driver or the like, controls various devices (e.g., the engine 2 and the motor 3) according to the selected running mode, and also controls the disengaging state of the clutches 20 and 30 in the transaxle 1. This control will be described below.

[2. Transaxle]

Figure 3:
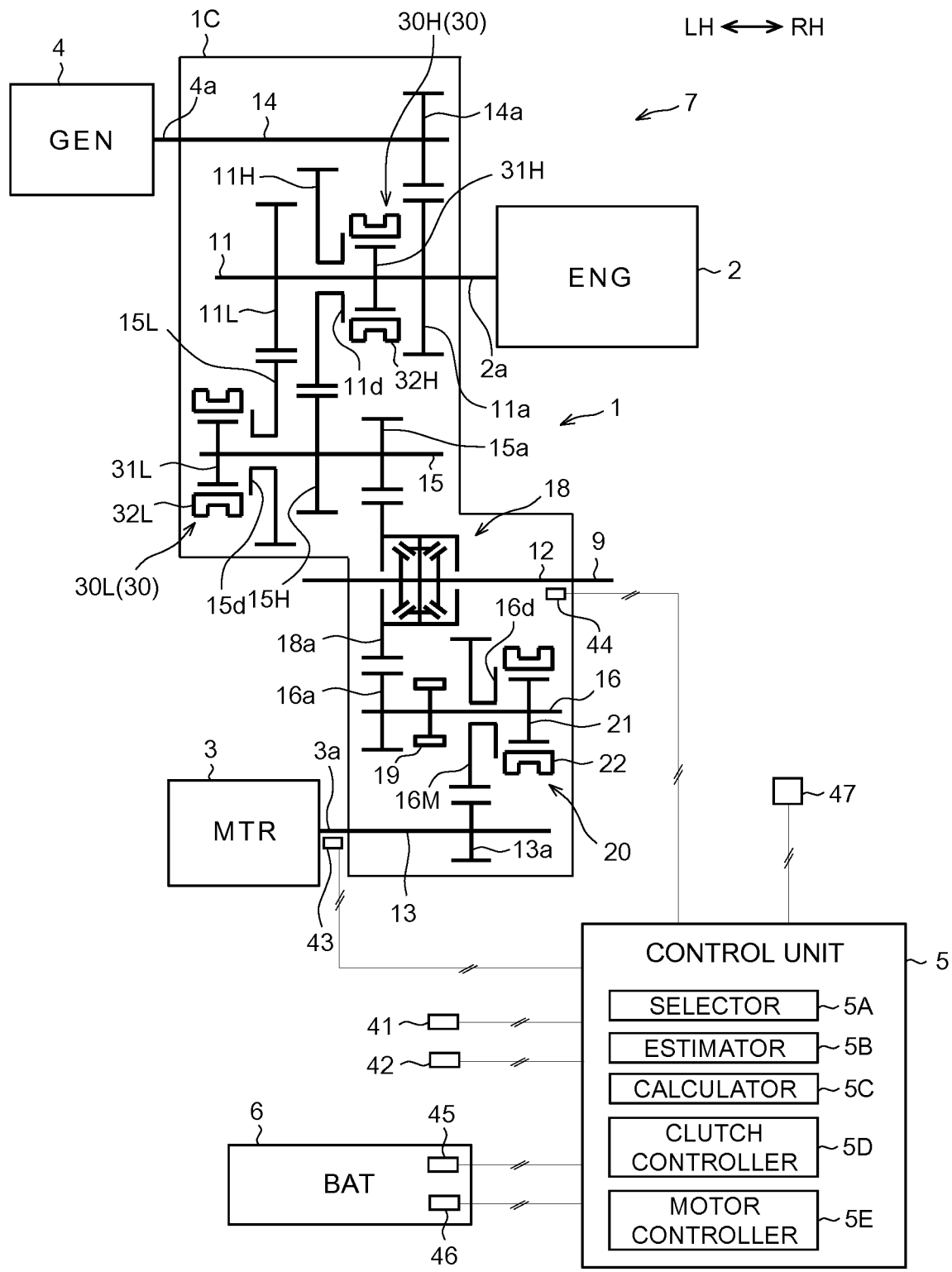
FIG. 3 is a skeleton diagram showing a powertrain including the transaxle of FIG. 2.

FIG. 3 is a skeleton diagram of a powertrain 7 including the transaxle 1 of the present embodiment. As shown in FIGS. 2 and 3, the transaxle 1 is provided with six shafts 11-16 arranged in parallel to each other. Hereinafter, a rotary shaft connected coaxially with the crankshaft 2a is referred to as an input shaft 11.

Similarly, rotary shafts connected coaxially with the drive shaft 9, a rotary shaft 3a of the motor 3, a rotary shaft 4a of the generator 4 are referred to as an output shaft 12, a motor shaft 13, a generator shaft 14, respectively. Further, the rotary shaft disposed on the power transmission path between the input shaft 11 and the output shaft 12 is referred to as a first counter shaft 15, and the rotary shaft disposed on the power transmission path between the motor shaft 13 and the output shaft 12 referred to as a second counter shaft 16. The both ends of each of the six shafts 11-16 are journaled to a casing 1C through non-illustrated bearings.

Three power transmission paths are formed inside the transaxle 1. Specifically, as shown by a two-dotted chain line in FIG. 2, a power transmission path (hereinafter referred to as "a first path 51") from the motor 3 to the output shaft 12 through the motor shaft 13, a power transmission path (hereinafter referred to as "a second path 52") from the engine 2 to the output shaft 12 through the input shaft 11, and a power transmission path (hereinafter referred to as "a third path 53") from the engine 2 to the generator shaft 14 through the input shaft 11 are formed. Here, the first path 51 and the second path 52 are driving-power transmission paths, the third path 53 is a power-generation-power transmission path.

The first path 51 (first power transmission path) is a path related to power transmission from the motor 3 to the drive wheels 8, which is involved in the power transmission of the motor 3. On the first path 51, the motor shaft 13 to which power is transmitted by rotating in synchronization with the motor 3 and a second counter shaft 16 to which the power of the motor shaft 13 power is transmitted are provided, and, on an intermediate point of the first path 51, a first dog clutch 20 (first connecting/disconnecting mechanism) that is to be described below and that disengages the power transmission through the first path 51 is interposed.

On the second path 52 (second power transmission path), the input shaft 11 to which power is transmitted by rotating in synchronization with the generator 4 and a first counter shaft 15 to which the power of the input shaft 11 power is transmitted are provided, and on an intermediate point of the second path 52, a second dog clutch 30 (second connecting/disconnecting mechanism) that is to be described below and that disengages the power transmission through the second path 52 and switches between high and low is interposed.

The third path 53 (third power transmission path) is a path relating to power transmission from the engine 2 to the generator 4, and is involved in power transmission at the start of the engine and power transmission at the time of electric power generation by the engine 2.

Next, the configuration of the transaxle 1 will be detailed with reference to FIG. 3. In the following description, a "fixed gear" means a gear provided integrally with a shaft and rotates in synchronization with the shaft (incapable of relative rotating). Further, the "idle gear" means a gear which is rotatably pivoted to the shaft.

The input shaft 11 is provided with, in sequence from the side near to the engine 2, a fixed gear 11a, the second dog clutch 30 on the high side (hereinafter, referred to as "the high-side dog clutch 30H"), an idle gear 11H, and a fixed gear 11L. Further, the first counter shaft 15 is provided with, in sequence from the side near to the engine 2, a fixed gear 15a, a fixed gear 15H, an idle gear 15L, the second dog clutch 30 on the low side (hereinafter, referred to as "the low-side dog clutch 30L").

The fixed gear 11a of the input shaft 11 always meshes with the fixed gear 14a provided on the generator shaft 14. This means that the input shaft 11 and the generator shaft 14 are connected via two fixed gears 11a and 14a to make it possible to transmit power between the engine 2 and the generator 4. Further, the fixed gear 15a of the first counter shaft 15 always meshes with a ring gear 18a of the differential 18 provided on the output shaft 12.

The idle gear 11H of the input shaft 11 has more teeth than the adjacent fixed gear 11L, and always meshes with the fixed gear 15H of the first counter shaft 15 to form a high-gear stage. Further, the fixed gear 11L of the input shaft 11 always meshes with the idle gear 15L of the first counter shaft 15 to form a low-gear stage. The idle gears 11H and 15L have dog gears 11d and 15d provided integrally on the side surface of each tooth surface portion meshing with the fixed gears 15H and 11L, respectively. Non-illustrated dog teeth are provided at the end portions (edges on radially outer parts) of the dog gears 11d and 15d.

Both the high-side clutch 30H and the low-side clutch 30L are clutch mechanisms provided on the second path 52 to control the disengaging state of the power of the engine 2 and to switch between the high-gear stage and the low-gear stage. In the present embodiment, when the running mode is the parallel mode, one of the high-side dog clutch 30H and the low-side dog clutch 30L is engaged and the other is disengaged. Incidentally, which of the clutches 30H, 30L is engaged is determined on the basis of, for example, the running state and the required output of the vehicle 10.

The high-side dog clutch 30H has a hub 31H fixed to the input shaft 11 and an annular sleeve 32H. Further, the low-side dog clutch 30L has a hub 31L fixed to the first counter shaft 15 and an annular sleeve 32L. The sleeves 32H, 32L are incapable of rotating relative to the respective hubs 31H, 32L and are coupled to the respective hubs 31H, 31L so as to be slidable in the axial direction of the hubs 31H, 31L. Each of the sleeves 32H, 32L slides in the axis direction by the control unit 5 controlling a non-illustrated actuator (e.g. servo motor). A stroke sensor that detects a movement amount (stroke amount) (not shown) is provided near each of the sleeves 32H, 32L. Further, spline teeth (not shown) that mesh with the dog teeth of the dog gears 11d and 15d are provided radially inward parts of the sleeves 32H and 32L, respectively.

In a state where the sleeve 32H engages with the dog gear 11d, the driving force from the engine 2 is transmitted to the output shaft 12 through the gear pair 11H and 15H on the high side. Conversely, in a state where the sleeve 32H is disengaged from the dog gear 11d, the idle gear 11H becomes idle state so that the second path 52 comes into a state the power transmission on the high side of the second path 52 is shut. Further, in a state where the sleeve 32L engages with the dog gear 15d, the driving force from the engine 2 is transmitted to the output shaft 12 through the gear pair 11L and 15L on the low side. In contrast, in cases where the sleeve 32L is separated from the dog gear 15d, the idle gear 5L becomes idle state so that the second path 52 comes into a state the power transmission on the low side of the second path 52 is shut.

The second counter shaft 16 is provided with, in sequence from the side near to the engine 2, a first dog clutch 20, an idle gear 16M, a parking gear 19, and a fixed gear 16a. The fixed gear 16a always engages with the ring gear 18a of the differential 18. The parking gear 19 is a component constituting the parking locking device. When the P-range is selected by the driver, the parking gear 19 engages with a parking plug (not shown) to inhibit rotation of the second counter shaft 16 (i.e., output shaft 12).

The idle gear 16M has more teeth than the fixed gear 13a provided on the motor shaft 13, and always meshes with the fixed gear 13a. The idle gear 16M has dog gears 16d provided integrally on the right side of the tooth surface portion meshing with the fixed gear 13a. At the tip portion of the dog gear 16d, dog teeth are provided. The first dog clutch 20 has a hub 21 which is fixed to the second counter shaft 16, and an annular sleeve 22 which is incapable of relatively rotate around the hub 21 (second counter shaft 16) and is slidably coupled to the hub 21 in the axial direction. The sleeve 22 slides in the axis direction by the control unit 5 controlling a non-illustrated actuator and the movement amount (stroke amount) of the sleeve 22 is detected by a non-illustrated stroke sensor. Spline teeth (not shown) that mesh with the dog teeth at the tip of the dog gear 16d are provided radially inward of the sleeve 22.

In the present embodiment, the first dog clutch 20 is engaged when the running mode is the EV mode or the series mode, or when the running mode is the parallel mode and motor assist is required. That is, the sleeve 22 is meshed (engaged) with the dog gear 16*d*, and the driving force from the motor 3 is transmitted to the output shaft 12. Further, when the running mode is a parallel mode and the assist by the motor 3 is not required, the first dog clutch 20 is disengaged. That is, the sleeve 22 and the dog gear 16*d* are separated, and the idle gear 16M comes into an idle state, so that the power transmission of the first path 51 comes into a state the power transmission on the first path 51 is shut.

[3. Control Configuration]

In the transaxle 1 described above, when the motor assist is not required while the vehicle is running in the parallel mode, the first dog clutch 20 interposed on the first path 51 is disengaged to separate the motor 3 from the output shaft 12. In the present embodiment, as described above, the control unit 5 controls all of the selection of the running mode, the states of engaging or disengaging of the dog clutches 20 and 30, and the operating states of the engine 2 and the motor 3, and the like. Hereinafter, among these controls, the control when the first dog clutch 20 is disengaged (hereinafter referred to as "motor disengaging control") will be described in detail.

The control unit 5 is provided with a selector 5A, an estimator 5B, a calculation unit 5C, a clutch controller 5D, and a motor controller 5E as elements that execute the motor disengaging control. These elements indicate some functions of the program executed by the control unit 5, and are assumed to be implemented by software. However, some or all of the functions may be achieved by hardware (electronic circuits), or may be achieved by a combination of software and hardware.

The selector 5A selects a running mode based on the driving state of the vehicle 10 and the charging state of the battery 6. The selector 5A of the present embodiment selects the parallel mode when the vehicle speed is equal to or greater than a predetermined vehicle speed Vp which is set on the basis of the charging rate of the battery 6. More specifically, the selector selects the parallel mode when the vehicle speed V is a predetermined vehicle speed Vp or more; and selects the series mode or the EV mode in accordance with, for example, the charging rate of the battery 6 or the required output Pd when the vehicle speed V is less than a predetermined vehicle speed Vp. The selector 5A of the present embodiment sets the predetermined vehicle speed Vp based on the charging rate of the battery 6. In other words, the charging status of the battery 6 is also considered in a determination threshold (predetermined vehicle speed Vp) of whether to select the parallel mode.

Figure 4:
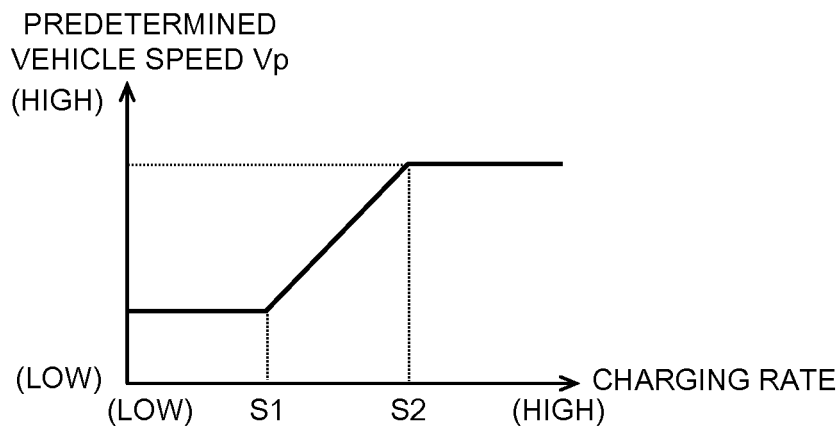
FIG. 4 is a diagram showing an example of a map used when a predetermined vehicle speed Vp is set.

The selector 5A of the present embodiment sets the predetermined vehicle speed Vp to a smaller value as the charging rate is lower. In other words, a lower charging rate of the battery 6 makes it easier to switch the running mode to the parallel mode, in which the engine is dominant. The selector 5A sets, as shown in FIG. 4 for example, the predetermined vehicle speed Vp using a map in which the predetermined vehicle speed Vp is set to be lower as the charging rate is lower in a range where the charging rate is equal to or greater than the first predetermined value S1 and less than the second predetermined value S2. The method of setting the predetermined vehicle speed Vp is not limited to this but the predetermined vehicle speed Vp may alternatively be set, for example, using a mathematical expression or a table that defines the relationship between the charging rate and the predetermined vehicle speed Vp or may be set to a fixed value in advance regardless of the charging rate.

Figure 5:
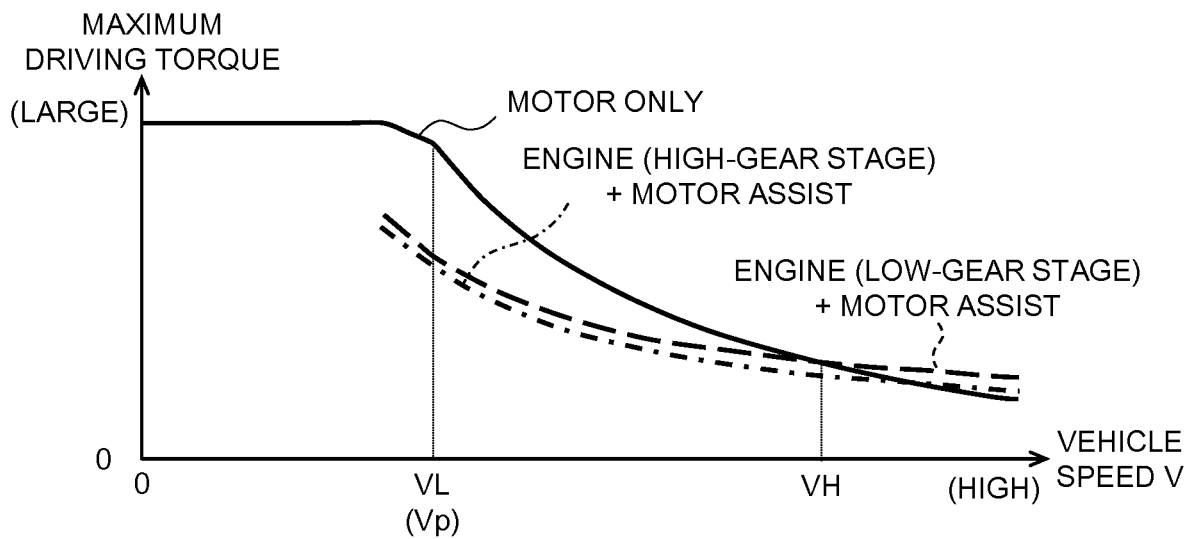
FIG. 5 is diagram showing a graph explaining the reason for selecting a parallel mode on the basis of a vehicle speed V.

Here, with reference to FIG. 5, description will now be made in relation to the reason why the selector 5A selects the parallel mode on the basis of the vehicle speed V. FIG. 5 is a graph showing the characteristics of the maximum driving torque with respect to the vehicle speed V that the vehicle 10 of the present embodiment has and indicates a case where the vehicle 10 is running in the EV mode (solid line) and a case of parallel running (broken line, one-dotted chain line). The graph in the solid line in the drawing is a characteristic when the vehicle 10 is running only on the motor 3 while the battery 6 is in the state of outputting the maximum output. The graph in the broken line is the characteristics when the engine 2 outputs the maximum output in the state where the low-gear stage selected and also when the motor assist is executed while the battery 6 is in the state of outputting the maximum output. The graph in the one-dotted line graph differs from the broken line in the point that the high-gear stage is selected.

As shown in FIG. 5, the maximum driving torque decreases as the vehicle speed V is higher in any of the running modes, but the graph of the solid line (running only on the motor 3) starts to descend rapidly from the vehicle speed value indicated by VL in the drawing and the magnitude relationship with a graph of the broken line is reversed at the vehicle speed value indicated by VH in the drawing. Therefore, by switching from the running only on the motor 3 to the running mainly on the engine in the vicinity of the vehicle speed value VL, in other words, by selecting the parallel running on the basis of the vehicle speed V, it is possible to achieve a running that can obtain large output torque.

The estimator 5B estimates the demand power Pd corresponding to the degree of accelerator opening (amount of operating an accelerator). The required output Pd is the output (output demand) demanded by the driver to the vehicle 10, and is set to be larger as the degree of accelerator opening is larger. The estimator 5B estimates the required output Pd based on, for example, the degree of accelerator opening and the vehicle speed V. In addition, a more accurate required output Pd may be estimated by considering parameters such as longitudinal acceleration, lateral acceleration, steering angle, and inclination of the vehicle body.

The calculator 5C calculates a maximum output B that the battery 6 can output then. The maximum output B is the maximum value of the removable (dischargeable) battery output from battery 6 at a certain moment. The maximum output B is a larger value as the charging rate of the battery 6 is higher. In addition to the charging rate of the battery 6, the calculator 5C may calculate the maximum output B by considering the degree of degradation of the battery 6 and the temperature of the battery 6. By considering the degree of degradation, it is possible to calculate the maximum output B commensurate with the power supply capacity of the battery 6. In addition, by considering the battery temperature, the maximum output B can be calculated within the range where the battery 6 can be escaped from being excessively electrically loaded. The charging rate is calculated (estimated) by the estimator 5C on the basis of the battery voltage and the battery current.

The clutch controller 5D (clutch mechanism controller) controls the engaging-disengaging state of the first dog clutch 20 and the engaging-disengaging state of the second dog clutch 30 in accordance with the running mode. The clutch controller 5D of the present embodiment determines whether or not a predetermined condition is satisfied during parallel running, and when the predetermined condition is satisfied, separates the motor 3 from the output shaft 12 by disengaging the first dog clutch 20. The predetermined condition of the present embodiment includes "the required output Pd being equal to or less than a predetermined output value Pp". In other words, the clutch controller 5D determines whether motor assist is required during parallel running, and when the required output Pd is small (i.e., motor assist is not required), separates the motor 3 from the output shaft 12 to prevent the motor 3 from rotating being accompanied. The output value Pp may be a fixed value set in advance, or may be a variable value set in accordance with, for example, the vehicle speed V, and the maximum output B of the battery 6.

The motor controller 5E (rotating electric machine controller) variably controls, when the first dog clutch 20 is disengaged, a standby rotation speed Nw of the motor 3. The standby rotation speed Nw here is the rotation speed when the motor 3 is kept to be standby. In other words, when the motor 3 is disengaged from the output shaft 12 during parallel running, the motor controller 5E controls the rotation speed of the motor 3 to be maintained at the standby rotation speed Nw. This can shorten the time (synchronization time) required to synchronize the rotation speed of the motor 3 to the axle rotation speed Na of the output shaft 12 when the first dog clutch 20 is engaged, so that the power performance can be improved.

The motor controller 5E of this embodiment controls the standby rotation speed Nw in accordance with the maximum output B of the battery 6. Specifically, the motor controller 5E controls the standby rotation speed Nw such that the difference X between the axle rotation speed Na and the standby rotation speed Nw becomes smaller as the maximum output B is lower. Although it is necessary to supply electric power to the motor 3 in order to synchronize the rotation speed of the motor 3 with the axle rotation speed Na, there is a problem that the power performance is lowered because synchronization time is increased when the maximum output B is small. Therefore, by setting the difference X smaller as the maximum output B is smaller, the synchronization time is prevented from increasing in order to ensure the power performance. In other words, the standby rotation speed Nw is set such that the synchronization time at the time of reconnection (reengaging) of the first dog clutch 20 is within a predetermined time even if the maximum output B of the battery 6 is lowered.

Further, the motor controller 5E of the present embodiment sets, when the maximum output B is equal to or less than a predetermined value Bp, the standby rotation speed Nw to match the axle rotation speed Na. This means that, although being disengaged from the output shaft 12, the motor 3 is controlled to rotate at the same rotation speed as the output shaft 12 side. This aims at shortening of the synchronization time by keeping the rotation speed of the motor 3 the same as the axle rotation speed Na after the motor 3 is disconnected from the output shaft 12 when the maximum output B is low as in the extremely low temperature of the battery 6 and there is a possibility of further prolongation of the synchronization time. Here, the predetermined value Bp is set in advance, considering the output characteristic of battery 6, and the power consumption amount of the motor 3 and synchronization time.

As described above, the motor controller 5E preferably controls the standby rotation speed Nw so that the synchronization time when the first dog clutch 20 is reengaged falls within a predetermined time. This control may be implemented in combination with control based on the maximum output B described above, or may be implemented in place of control based on the maximum output B. Incidentally, the predetermined time described here is a time set in advance in order to prevent a decrease in power performance due to a prolonged synchronization time. The synchronization time is also determined by the difference X between the axle rotation speed Na and the standby rotation speed Nw and the maximum output B. For the above, a map or the like that defines the relationship among these two parameters X and B and the synchronization time is stored in advance, and the synchronization time can be acquired by applying the difference X and the maximum output B to the map.

Further, the motor controller 5E of the present embodiment sets, in cases where the ECO mode is set, the standby rotation speed Nw to 0. Since the ECO mode is a driving mode in which fuel efficiency and electric efficiency are evaluated more highly than accelerability, the amount of power consumed while the motor 3 is disconnected from the output shaft 12 when the driver is selecting the ECO mode, is suppressed by setting the standby rotation speed Nw to 0 (i.e., to stop the motor 3).

Figure 6:
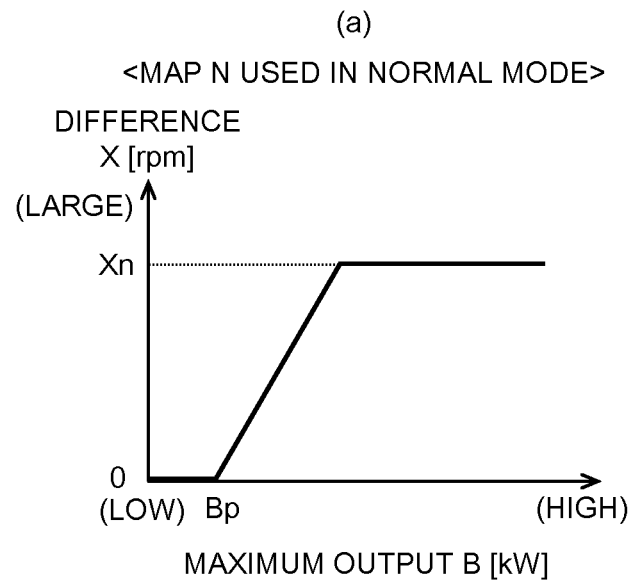
FIGS. 6(a) and 6(b) are diagrams showing examples of a map for setting a standby rotation speed Nw.
Figure 6:
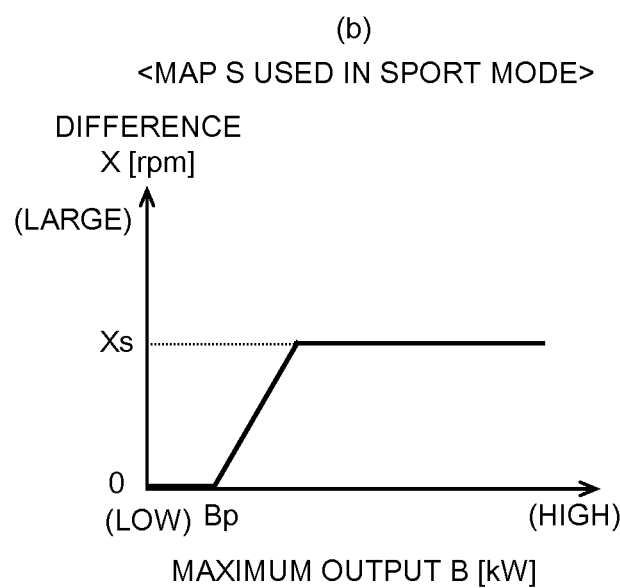

Incidentally, the motor controller 5E may control the standby rotation speed Nw in accordance with the maximum output B for each driving mode (depending on whether the driving mode is the normal mode or the sport mode). For example, as shown in FIGS. 6(a) and 6 (b), a map is prepared for each driving mode in advance in which map the horizontal axis represents the maximum output B and the vertical axis represents a difference X (=Nw-Na) obtained by subtracting the standby rotation speed Nw from the axle rotation speed Na. FIG. 6(a) is a map N used in the normal mode, and FIG. 6(b) is a map S used in the sport mode.

In the maps shown in FIGS. 6(a) and 6(b), the maximum value Xs of the vertical axis (difference X) of the map S is set to be smaller than the maximum value Xn of the vertical axis (difference X) of the map N. In these maps, the change rate (the slope of the graph) of the difference X from the predetermined value Bp to the maximum value Xs on the map S is set to be equal to the change rage (the slope of the graph) of the difference X from the predetermined value Bp to the maximum value Xn of the map N. That is, if the maximum output B is higher than the predetermined value Bp in these two maps, the difference X in the sport mode is set to be smaller than that in the normal mode. In other words, the synchronization time at the time of reengaging of the first dog clutch 20 in the sport mode is set to be shorter than that in the normal mode.

In cases where the first dog clutch 20 is disengaged during parallel running, the mode controller 5E selects the map N of FIG. 6(a) if the driving mode set at that time is the normal mode, and selects the map S of FIG. 6(b) if the driving mode is the sport mode. Then, the maximum output B calculated by the calculator 5C is applied to the map N or the map S to obtain the difference X, the value (Na—X) obtained by subtracting the difference X from the axle rotation speed Na detected by the rotation speed sensor 44 is set to be the standby rotation speed Nw.

As described above, the motor controller 5E of the present embodiment sets, in cases where an ECO mode is set, the standby rotation speed Nw to 0. Consequently, the difference X when the ECO mode is set comes to be equal to the axle rotation speed Na, and becomes larger than the maximum value Xs of the vertical axis (difference X) of the map S. That is, in the present embodiment, when the sport mode is set among the multiple driving modes, the standby rotation speed Nw is controlled such that the difference X is smaller than that in cases where the other driving mode is set (when the sport mode is not set). In other words, when the sport mode is set, the standby rotation speed Nw is controlled so that the synchronization time when the first dog clutch 20 is reengaged is shorter than that when another driving modes are set.

[4. Flow Chart]

Figure 7:
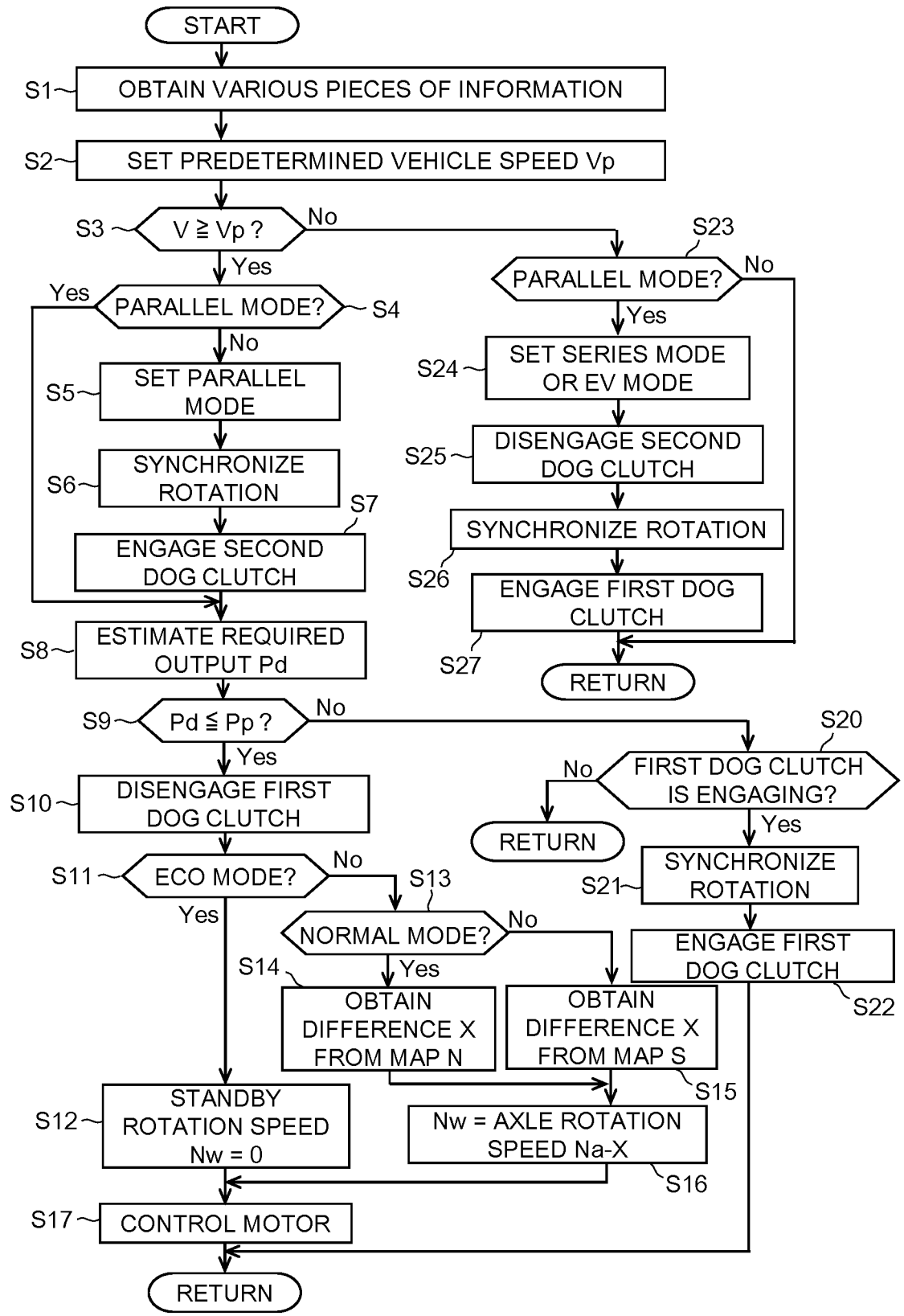
FIG. 7 is an example of a flowchart of motor disengaging control implemented in the control unit of FIG. 1.

FIG. 7 is a flowchart example for explaining the contents of the motor disengaging control described above. This flowchart is performed at a predetermined arithmetic cycle by the control unit 5 while the vehicle 10 is running. The running mode (EV mode, series mode, and parallel mode) of the vehicle 10 is set separately from the flowchart.

In Step S1, information from each of the sensors 41 to 46 and the mode setting switch 47 is transmitted. In Step S2, a predetermined vehicle speed Vp corresponding to the charging rate is set by the selector 5A, and in the subsequent Step S3, the vehicle speed V is determined whether to a predetermined vehicle speed Vp or more. If V<Vp, the process proceeds to Step S23 and if V≥Vp, the process proceeds to Step S4. In Step S4, it is determined whether or not the current running mode is the parallel mode. If the current running mode is the parallel mode, the process proceeds to Step S8, and if the current running mode is not the parallel mode, the process proceeds to Step S5, where the running mode is switched to the parallel mode.

In step S6, rotational synchronization of the high-side dog clutch 30H or the low-side dog clutch 30L is performed, and the second dog clutch 30 is engaged (Step S7). This achieves running mainly on the engine. Next, in Step S8, the required output Pd is estimated by the estimator 5B, and is determined whether to be equal to or less than the predetermined output value Pp in Step S9. If Pd≤Pp, since the motor assist is not required, the process proceeds to Step S10 to disengage the first dog clutch 20.

In Step S11, whether the current driving mode is the ECO mode is determined. If the current driving mode is the ECO mode, the standby rotation speed Nw is set to 0 (Step S12) so that the rotation speed of the motor 3 is controlled so as to be 0, and this flow is returned. That is, since the motor 3 is stopped in this case, an amount of power consumption is eliminated in order to maintain the motor 3 to the standby rotation speed Nw greater than 0.

On the other hand, if the current driving mode is not the ECO mode, a determination is made as to whether or not the current driving mode is the normal mode in Step S13. In the current driving mode is the normal mode, the difference X is acquired from the map N (Step S14), and if the current driving mode is the sport mode, the difference X is acquired from the map S (Step S15). Then, in Step S16, the difference X is subtracted from the axle rotation speed Na, the standby rotation speed Nw is set. In Step S17, the motor 3 is controlled to have the set standby rotation speed Nw, and this flow is returned.

In cases where the flow is returned in the normal mode or the sport mode, if the required output Pd becomes larger than the output value Pp in the next and subsequent arithmetic cycles (No in Step S9), the process proceeds to step S20 because the motor assist is required, and whether or not the first dog clutch 20 is disengaged is determined. If the first dog clutch 20 is disengaged, the rotation speed of the motor 3 is synchronized with the axle rotation speed Na (Step S21). At this time, since the motor 3 is maintained at the standby rotation speed Nw greater than 0, the synchronization time is shortened. Once the rotation is synchronized, the first dog clutch 20 is engaged in Step S22 to return this flow.

In Step S3, when the vehicle speed V is less than the predetermined vehicle speed Vp, the running mode is switched to the series mode or the EV mode. That is, when the process proceeds from Step S3 to Step S23, it is determined whether or not the current running mode is the parallel mode (Step S23). If the current running mode is not the parallel mode, this flow is returned, and if the current running mode is the parallel mode, the series mode or the EV mode is set (Step S24). Then, the second dog clutch 30 is disengaged (Step S25), and if the first dog clutch 20 is disengaged, the rotations are synchronized (Step S26), the first dog clutch 20 is engaged (Step S27), and then the flow is returned. Also in the synchronizing in step S26, since the motor 3 is maintained at the standby rotation speed Nw greater than 0, shortening of the synchronization time is achieved.

[5. Effects]

(1) In the above-described control unit 5, since the first dog clutch 20 is disengaged when a predetermined condition is satisfied in the parallel mode running mainly on the engine, it is possible to prevent the rotation being accompanied of the motor 3. Thus, this can eliminate the requirement of the conventional flux-weakening control, so that the electric efficiency can be enhanced. Further, since the standby rotation speed Nw of the motor 3 is variably controlled while the first dog clutch 20 is disengaged, it is possible to shorten the synchronization time when the first dog clutch 20 is engaged. In the event of engaging the first dog clutch 20, the clutch engagement can be rapidly accomplished. This can prevent a decrease in the power performance of the vehicle 10 and consequently ensure the power performance.

Further, in the control unit 5 described above, the parallel mode is selected based on the vehicle speed V in consideration of the charging condition of the battery 6. Then, since the first dog clutch 20 is disengaged when the predetermined condition is satisfied, the vehicle 10 can be driven by efficiently utilizing the engine output, which makes it possible to prevent a decrease in the power performance.

(2) In the control unit 5 described above, since the standby rotation speed Nw is controlled in accordance with the maximum output B that the battery 6 is capable of outputting, it is possible to run the vehicle 10 while balancing securing of the power performance and improvement in electric efficiency.

(3) Further, in order to synchronize the rotations by increasing the rotation speed of the motor 3 for engaging the clutch, the motor 3 needs to be supplied with electricity and the synchronization time may be more prolonged as the maximum output B of the battery 6 is lower. As a solution to the above, since the standby rotation speed Nw is controlled such that the difference X comes to be smaller as the maximum output B of the battery is lower (i.e., the standby rotation speed Nw is set to a value nearer to the axle rotation speed Na as the maximum output B is lower), the synchronization time can be shortened and thereby the power performance can be ensured.

(4) Further, if the maximum output B is equal to or less than the predetermined value Bp, the standby rotation speed Nw is set to the same value as the axle rotation speed Na. Therefore, even in a situation where it is difficult to secure battery output, such as at extremely low temperatures in the battery 6, keeping the motor 3 standby at the same rotation speed as the axle rotation speed Na makes it possible to shorten the synchronization time, thereby ensuring the power performance.

(5) Further, the standby rotation speed Nw is controlled such that the synchronization time when the first dog clutch 20 is reengaged is within a predetermined time. Consequently, the time that synchronization when the dog clutch 20 is reengaged takes can fall within a constant time, not depending on the maximum output B of the battery 6. Therefore, it is possible to ensure the power performance of the vehicle 10.

(6) In the control unit 5 described above, since the standby rotation speed Nw is set to 0 (i.e., the operation of the motor 3 is stopped) when the ECO mode is set, it is possible to eliminate the consumption of electric power to keep the motor 3 at the standby rotation speed Nw, so that the electric efficiency can be enhanced.

(7) In the control unit 5 described above, when the sport mode is set, the standby rotation speed Nw is controlled such that the synchronization time when the first dog clutch 20 is reengaged comes to be shorter than that of cases where another driving mode is set. Consequently, for example, as compared with cases where another driving mode exemplified by the normal mode or the ECO mode is set, synchronization when the dog clutch 20 is engaged takes a shorter time in the sport mode, so that it is possible to achieve the running more highly evaluating accelerability.

(8) Since the predetermined condition to disengage the first dog clutch 20 includes "the required output Pd being equal to or less than the predetermined output value Pp", it is possible to prevent the motor 3 from being rotated being accompanied under a state where the vehicle 10 can drive only on the engine 2 (i.e., a state where motor assist is not required).

[6. Modification]

In the embodiment described above, the vehicle 10 is assumed to be a two-wheel-drive hybrid vehicle that mounts the engine 2 and the motor 3 on the front side thereof. The above motor disengaging control, as shown by a two-dotted chain line in FIG. 1, can be applied to a four-wheel-drive hybrid vehicle that also mounts a rear motor 3R on the rear side thereof. This means that the vehicle 10 may include a front motor 3 (first rotating electric machine) for driving the front wheels 8 and a rear motor 3R (second rotating electric machine) for driving rear wheels R.

The rear motor 3R shown by a two-dotted chain line in FIG. 1 is connected via a second transaxle 60 to the shaft (axle) connecting the right and left rear wheels 8R. However, the second transaxle 60 does not include a clutch. That is, the rear motor 3R is connected to the rear wheels 8R without a clutch. One of the conditions (predetermined conditions) to disengage the first dog clutch 20 of this structure preferably include "the maximum output Pr that the rear motor 3R can output being larger than the maximum output B that the battery 6 can output". This means that when all the power of the battery 6 is consumed in the rear motor 3R to generate torque, separating the front motor 3 from the output shaft 12 can prevent rotation being accompanied of the front motor 3, leading to enhancement in power efficiency.

Further, if such a four-wheel-drive hybrid vehicle is driven only on the power of the rear motor 3R while running in the EV mode or the series mode, the clutch controller 5D described above preferably disengage the first dog clutch 20. That is, even during the EV running or series running, if the output can be reserved only by the rear motor 3R, disconnection of the front motor 3 from the output shaft 12 makes it possible to prevent the front motor 3 from rotation being accompanied, leading to enhancement in electric efficiency.

The control of this modification may be applied to a hybrid vehicle in which the above-described power train 7 is mounted on the rear side thereof to allow the above motor 3 to drive rear wheels 8R and the second rotating electric machine (motor) is mounted on the front side thereof to drive the front wheels 8. The control of this modification can be applied to a vehicle provided with a first rotating electric machine that drives at least one of a set of the front wheels 8 and a set of the rear wheels 8R and a second rotating electric machine that drives at least the other set.

[7. Miscellaneous]

The above contents of the motor disengaging control are only an example, and are not limited to those described above. For example, the above embodiment uses different maps to set the standby rotation speed Nw between the normal mode and the sport mode, but alternatively use a common map for setting the standby rotation speed Nw regardless of the driving mode. Alternatively, the standby rotation speed Nw may be set by using, for example, a mathematical expression in place of such a map.

Further, the above embodiment sets the standby rotation speed Nw to 0 in the ECO mode, but alternatively, the motor 3 may maintain the standby rotation speed Nw at a value greater than 0 even in the ECO mode. In the driving modes except for the ECO mode, the above the standby rotation speed Nw is a variable value according to the maximum output B of the battery 6, but may alternatively be a fixed value set in advance.

In addition, the predetermined conditions described above are only examples, and may include another conditions. For example, one of the predetermined conditions may be that "the driving mode is the ECO mode or the normal mode". This means that the predetermined condition may include "the sport mode being not set". In this alternative, if the driving mode is a sport mode, since the first dog clutch 20 is not disengaged (because disengaging of the first dog clutch 20 is prohibited), accelerability can be valued more highly. Further alternatively, the predetermined condition may include a condition related to, for example, the charging rate and/or the maximum power B of the battery 6.

The structure of the transaxle 1 controlled by the control unit 5 described above is only an example, and is not limited to that described above. For example, in the transaxle 1 described above, the second dog clutch 30 is provided on each of the input shaft 11 and the first counter shaft 15, but alternatively, a single second dog clutch may be provided either one of the shafts 11 and 15. Further, both the first clutch mechanism and the second clutch mechanism are not limited to the dog clutches and may alternatively be clutch mechanisms such as a hydraulic friction clutch or an electromagnetic clutch. In addition, these clutch mechanisms may be disposed at positions other than those described above.

The above-described driving mode and running mode are examples, and modes other than the above-described modes may be included, or any of the above-described modes may be omitted. The relative positions of the engine 2, the motor 3, and the generator 4 to the transaxle 1 are not limited to those described above. Depending on these relative positions, the arrangement of the six axles 11 to 16 in the transaxle 1 may be set. The arrangement of the gears provided on the respective shafts in the transaxle 1 is also an example, and is not limited to the one described above.

Further, the above-described motor disengaging control is applicable to a vehicle including a rotating electric machine (e.g., motor and motor-generator) serving as a driving source, an engine, and a driving-purpose battery, which vehicle is further provided with a dog clutch disposed on a first power transmission path from the rotating electric machine to the driving wheels and another clutch mechanism disposed on a second transmission path from the engine to the driving wheels. That is, the motor disengaging control described above may be applied to a vehicle having a transmission device different from the transaxle 1 described above.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

DESCRIPTION OF REFERENCE SIGNS

2 engine
3 motor, front motor (first rotating electric machine)
3R rear motor (second rotating electric machine)
4 generator (third rotating electric machine)
5 control unit
5A selector
5B estimator
5C calculator
5D clutch controller (connecting/disconnecting mechanism controller)
5E motor controller (rotating electric machine controller)
6 battery
8F driving wheel, front wheel, wheel
8R rear wheel, wheel
10 vehicle
12 output shaft
20 first dog clutch (first connecting and disconnecting mechanism)
30 second dog clutch (second connecting and disconnecting mechanism)
44 rotation speed sensor
51 first path (first power transmission path)
52 second path (second power transmission path)
Pd required output
Pp predetermined output value
Pr maximum output of the rear motor
B maximum output
Bp predetermined value
Na axle rotation speed
Nw standby rotation speed
V vehicle speed
Vp predetermined vehicle speed

The invention claimed is:

1. A control unit for controlling a vehicle comprising a first rotating electric machine that serves as a driving source for running the vehicle and that exchanges electric power with a battery, and an engine that serves as the driving source, wherein;
the vehicle comprises a first connecting/disconnecting mechanism disposed on a first power transmission path from the first rotating electric machine to a driving wheel, a second connecting/disconnecting mechanism disposed on a second power transmission path from the engine to the driving wheel, and a rotation speed sensor that detects, as an axle rotation speed, a rotation speed correlated with a rotation speed of a side of the driving wheel; and
a first running mode in which the vehicle is driven by power of the engine in a state where the second connecting/disconnecting mechanism is engaged, and another running mode in which the first connecting/disconnecting mechanism is engaged and the second connecting/disconnecting mechanism is disengaged are set for the vehicle;
the control unit comprises:
a connecting/disconnecting mechanism controller that disengages the first connecting/disconnecting mechanism when a predetermined condition is satisfied during the first running mode;
a rotating electric machine controller that variably controls a standby rotation speed of the first rotating electric machine when the first connecting/disconnecting mechanism is disengaged;
a calculator that calculates a power supplying capability of the battery,
the rotating electric machine controller controls the standby rotation speed such that a difference between the axle rotation speed and the standby rotation speed comes to be smaller when the power supplying capability is lower.

2. The control unit according to claim 1, wherein
the calculator calculates, as the power supplying capability, a maximum output that the battery is capable of outputting; and
the rotating electric machine controller controls the standby rotation speed in accordance with the maximum output.

3. The control unit according to claim 1, wherein:
the calculator calculates, as the power supplying capability, a maximum output that the battery is capable of outputting; and
the rotating electric machine controller controls the standby rotation speed such that a difference between the axle rotation speed and the standby rotation speed comes to be smaller as the maximum output is lower.

4. The control unit according to claim 3, wherein the rotating electric machine controller makes the standby rotation speed match the axle rotation speed when the maximum output is equal to or smaller than a predetermined value.

5. The control unit according to claim 1, wherein the rotating electric machine controller controls the standby rotation speed such that a synchronization time taken to reengage the first connecting/disconnecting mechanism is a predetermined time or shorter.

6. The control unit according to claim 1, wherein:
a plurality of driving modes are set for the vehicle independently of the running modes; and
the rotating electric machine controller sets the standby rotation speed to zero when an energy saving mode in which consumption of at least one of electric power and fuel is suppressed among the plurality of driving modes is set.

7. The control unit according to claim 1, wherein:
a plurality of driving modes are set for the vehicle independently of the running modes; and
the rotating electric machine sets the standby rotation speed such that a synchronization time taken to reengage the first connecting/disconnecting mechanism when a sport mode in which accelerability is valued highly among the plurality of driving modes is set is shorter than a synchronization time when a driving mode except for the sport mode is set.

8. The control unit according to claim 1, wherein:
a plurality of driving modes are set for the vehicle independently of the running modes; and
the predetermined condition comprised a sport mode in which accelerability is valued highly not being set among the plurality of driving modes.

9. The control unit according to claim 1, further comprising an estimator that estimates a required output based on a depression amount of an acceleration pedal, wherein the predetermined condition comprises the required output being a predetermined output value or smaller.

10. The control unit according to claim 1, wherein:
the vehicle further comprises the first rotating electric machine that drives one wheel of a front wheel and a rear wheel, and a second rotating electric machine that drives the other wheel of the front wheels and the rear wheels; and
the predetermined condition comprises a maximum output that the second rotating electric machine is capable of outputting is larger than the maximum output that the battery is capable of outputting.

11. The control unit according to claim 10, wherein:
the vehicle further comprises a third rotating electric machine that supplies the battery with electric power by generating the electric power when being driven with the power of the engine; and
a second running mode in which at least one of power of the first rotating electric machine and power of the second rotating electric machine is transmittable to the wheel in a state where the second connecting/disconnecting mechanism is disengaged and the engine is stopped, and a third running mode in which at least one of the power of the first rotating electric machine and the power of the second rotating electric machine is transmittable to the wheel in a state where the second connecting/disconnecting mechanism is disengaged and the third rotating electric machine is generating power are set for the vehicle; and
the connecting/disconnecting mechanism controller disengages the first connecting/disconnecting mechanism when the vehicle is driven by the power the second rotating electric machine, not using the first rotating electric machine, during the second running mode or the third running mode.

* * * * *